United States Patent [19]

Armold et al.

[11] Patent Number: 4,541,933
[45] Date of Patent: Sep. 17, 1985

[54] PROCESS FOR SEPARATION OF ASH FROM WASTE ACTIVATED SLUDGE

[76] Inventors: Clark W. Armold, 3711 Cypress Hill Dr., Spring, Tex. 77373; Michael B. Huebner, 3463 Garden Grove, Houston, Tex. 77066; David Tobin, 1661 Sterling Rd., Charlotte, N.C. 28209

[21] Appl. No.: 610,132

[22] Filed: May 14, 1984

[51] Int. Cl.⁴ .............................................. B01D 21/26
[52] U.S. Cl. .................................... 210/780; 210/787; 210/805; 210/806
[58] Field of Search ................ 210/609, 780, 787, 788, 210/790, 805, 806, 512.2; 204/16, 17

[56] References Cited

U.S. PATENT DOCUMENTS

| | | | |
|---|---|---|---|
| 3,788,469 | 1/1974 | Hirsch et al. | 210/788 |
| 3,849,246 | 11/1974 | Raymond et al. | 210/788 X |
| 3,929,639 | 12/1975 | Turner et al. | 210/512.2 X |
| 3,989,628 | 11/1976 | Bier | 210/788 X |
| 4,274,968 | 1/1981 | Grutsch et al. | 210/787 X |
| 4,425,228 | 1/1984 | Lynn et al. | |

Primary Examiner—Thomas Wyse
Attorney, Agent, or Firm—Pravel, Gambrell, Hewitt & Kimball

[57] ABSTRACT

A process and apparatus for removal of ash from a waste activated sludge stream includes a pressure regulator for controlling the pressure of incoming waste activated sludge containing water or supernatant, carbon and ash as suspended solids; a first stage separation including a plurality of parallel mounted hydrocyclones for receiving the controlled pressure incoming waste activated sludge for separation into a first fluid output containing substantially supernatant and carbon and a second fluid output containing a greater concentration of ash; and a second separation stage including a vibrating screen which receives the second fluid output from the first separation stage, such vibrating screen allowing substantially only the passage of supernatant and carbon therethrough thus producing a third fluid output and a fourth output of ash concentrate which can be ultimately removed from the process.

10 Claims, 4 Drawing Figures

PROCESS FOR SEPARATION OF ASH FROM WASTE ACTIVATED SLUDGE

TECHNICAL FIELD OF THE INVENTION

This invention relates to the process of separating ash from a mixture of carbon, ash and supernatant which results from the process of "wet air oxidation" in a waste water treating plant.

BACKGROUND OF THE INVENTION

In the treatment of waste waters and especially as relates to the waste water treatment process referred to as "activated sludge systems" activated carbon is known to be beneficial. In the activated sludge system there is a requirement to remove from time to time or on a continuous basis some of the solids in the stream commonly referred to as "waste activated sludges". Such sludges contain powdered activated carbon and inert materials referred to as ash which must be removed from the system to prevent excessive build up of total solids in the process. There is also a need to reactivate the powdered carbon so that it can be reused. The powdered carbon and/or other forms of activated carbon can be reactivated and made suitable for reuse in a regeneration process known in the industry as "Wet Air Oxidation" (oxidation using oxygen either from the air or pure oxygen and high temperature without the use of flame induced heat). Under proper operating conditions the regeneration system proceeds in a wet oxidation reactor autothermal with operating temperatures 400°–550° F. and operating pressures 350 psig-900 psig. Under certain operating conditions the wet air oxidation reactor blow down that settles out from the bottom of the reactor along with some carbon is blown off into a "tank" commonly referred to as a "blow down tank". From the blow down tank the ash and some carbon is removed by flushing using water which mixes in with the blow down water, ash and carbon (to form a more dilute sludge). Ash must be removed from this mixture to eliminate build up of the inert ash in the activated sludge system.

Also, in the wet air oxidation process there is a continuous flow stream leaving the wet air oxidation reactor or system taking large quantities of reactivated carbon and some ash back to the treatment system. This is a continuous operation whenever the reactor and/or regeneration system is in operation. It is desirable to limit the amount of ash returning to the system, which would require separation of powdered carbon and water completely or partially from the ash so as to produce a cake or concentrated ash solid that can be handled and disposed of as an inert sterile solid on the property or in any other land disposal system available to the operation.

Another process requiring separation of ash is the controlled flame incineration operating at and under a controlled atmosphere which would limit the oxygen so as to produce ash but reactivate the carbon. In this latter process the hot burning ash-carbon mixture is dumped or introduced into a water quench tank and this resulting mixture requires separation of the carbon, ash and water. The processes also requires the carbon to remain in the liquid mixture and be returned to the process or in some cases to be returned to a tank for storage and reuse.

In all cases it is cost effective to remove the maximum amount of water from the ash so as to facilitate the disposal of the ash. This ash is inert and sterilized and does not present a problem for disposal and handling as long as the water content is low so as to have a mixture that would not be in a fluidized state that would tend to flow out of the area selected for disposal.

One known and used system for separating the powdered carbon portion from the ash uses gravity settling devices which, by regulation of the recirculation rate, the powdered carbon with water can be removed and taken back to the system for reuse with the heavier ash settling for removal of the ash and water from settling tanks. This system can have certain deficiencies in that the specific gravity and the temperature conditions can vary to such extent that there is not a satisfactory or economical separation and recovery of the carbon. One of the problems generally associated with this type of removal system is that the ash and some carbon forms a very dense, firm, cake on the bottom of the tank which creates a problem in removal. For removal, this cake or heavy type of sludge mixture has to be flushed out using additional water which fluidizes the cake and sludge resulting in a requirement for further separation and removal of excess water to facilitate and allow disposal of the ash on to the disposal site or ground. If the water is not removed then disposal is a problem. Furthermore, in the tank settling system considerable valuable activated carbon is mixed in and removed, resulting in valuable material being thrown away and lost. In connection with the tank settling system, it is known that temperature changes result in change in the settling or separation of carbon; therefore, changes in temperature of the water in the tank, changes in the amount of blow down and temperature of the cooled blow down water carbon ash mixture results in a variable process which is difficult to control and requires considerable time of personnel for operation of the system.

SUMMARY OF THE INVENTION

It is the object of this invention to provide a new and improved method and apparatus for the separation of water and carbon and removal of a substantial portion of ash out of a waste activated sludge stream containing water, ash and powdered carbon produced in a waste water treatment process.

The process of this invention for the substantial removal of ash from a waste activated sludge containing water, ash and powdered carbon comprises the steps of receiving such waste activated sludge and controlling the pressure of the waste activated sludge stream and circulating the waste activated sludge stream to a first separation stage at which the waste activated sludge is circulated through a plurality of hydrocyclones positioned in parallel flow paths to produce a first output effluent fluid containing substantially water and powdered carbon and a substantially lesser concentration of ash and second fluid output containing water, carbon and a substantially greater concentration of ash; collecting said first output fluid into a return for recirculation; and, circulating the second output from the first separation stage through a second separation stage to further separate ash from the first stage second fluid output to produce a third fluid output containing substantially water and powdered carbon and a fourth output which is an ash concentrate for disposal.

The apparatus of this invention for separating water and powdered carbon from a waste activated sludge stream includes a pressure regulation means for receiving an incoming waste activated sludge stream and controlling the pressure thereof; a first stage separation means mounted in fluid communication with the pressure regulation means for separating the incoming waste activated sludge into a first fluid output containing water and powdered carbon and a second fluid output containing water and a substantially greater concentration of ash; second stage separation means mounted in fluid communication with the first stage separation means for receiving the second fluid output from the first stage separation means and directing the second fluid output onto a vibrating screen which allows the passage of water and powdered carbon through the screen to produce a concentrate containing ash on the screen for removal therefrom.

This description of the invention is intended as a summary only and is not intended to include all the patentable features of this invention, which will be set forth in the claims and described in the specification.

DESCRIPTION OF THE PREFERRED EMBODIMENT

Figure 1:
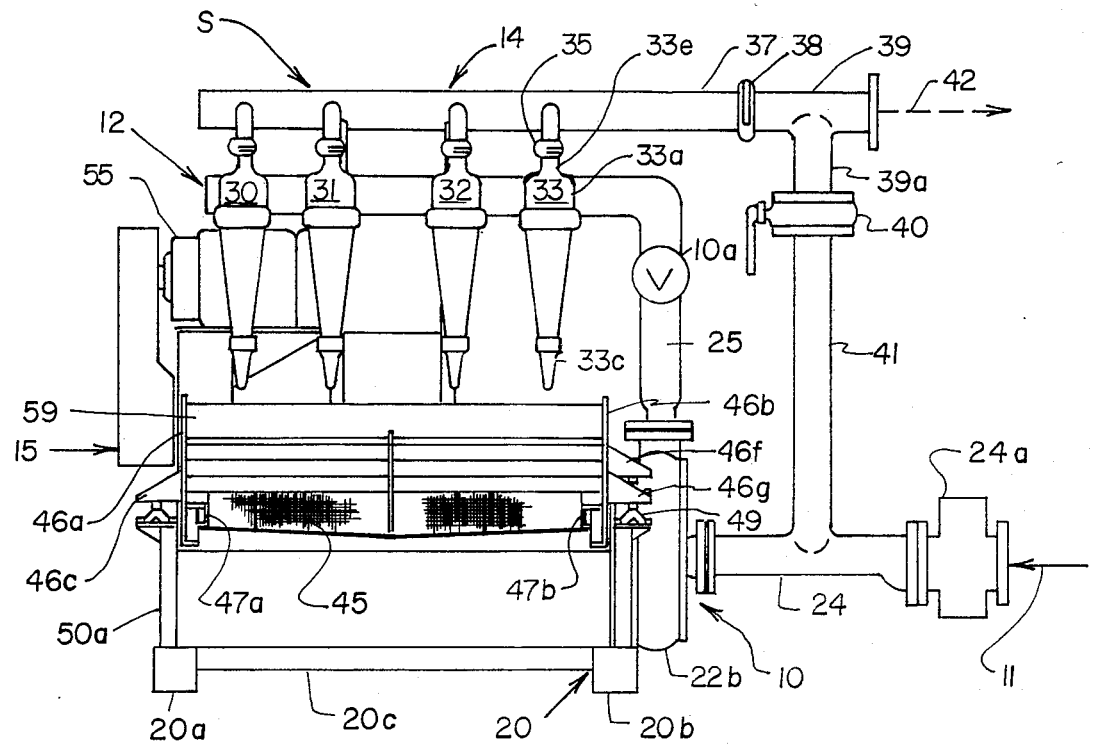
FIG. 1 is a front view of the separation apparatus of this invention.

It is known to use a reactor operated at a temperature of from 400°–550° Fahrenheit and at a pressure of 350–900 pounds per square inch gauge as part of the waste water treatment process used to recover activated carbon and to oxidize organic biomass to ash. This is commonly referred to as the wet air oxidation system. A slurry consisting of a mixture of powdered carbon, ash and organic biomass is introduced into the reactor for reactivation or regeneration of the powdered carbon which carbon along with ash and considerable liquid, is discharged back into the sewage treatment system as a result of oxidation in the reactor. A considerable amount of ash, including some heavier solids, and some carbon settles to the bottom of the reactor during such oxidation. To limit the depth of settlement, it is necessary to remove the bottom sludge periodically in order to maintain performance of the system at an efficient level. Thus the ash, carbon and water mixture is blown down or removed from the reactor into a "blow down" tank wherein more water may be added to cool the blow down mixture before the mixture is delivered to a separation and removal system. In either case it is economically desirable to recover the carbon that is mixed in with the ash and to return the reactivated carbon to either storage or directly to the treatment system and at the same time remove the ash material so that it does not accumulate excessively in the activated sludge system.

One presently used separation and removal system previously described is often utilized to separate water and powdered carbon from the ash and water and concentrate the ash for disposal. The problems with this known separation system have already been described. The process and apparatus S of this invention is provided for the treatment of the blow down mixture which contains a partially cooled mixture of water, ash and powdered carbon, which will be referred to herein as the "waste activated sludge". Typically, the mixtures to be handled in the removal systems will vary considerably thereby complicating the removal system. The concentrations of blow down solids could be within the range of 100,000–3,000,000 mg/l and within this concentration of suspended solids the powdered carbon content could be from 10% to 50% with ash content of 20% to 80% and the extreme variability in these concentrations is a result of variations in the feed solids mixture to the wet air oxidation system. The final percentage of suspended solids in the liquid going to the separation system can vary considerably depending on solids concentration in the bottom of the reactor, length of time the blow down valves are open and in some cases the amount of water that is introduced for cooling the mixture.

In the operation handling the ash removal from the continuous discharge stream from the wet air oxidation system the total suspended solids could be within the range of 2% to 30% with considerable variation occurring in the percentage of ash to powdered carbon because of the variation in the flow (velocity) to the reactor and the supply concentration; also, the amount of ash that could be returning from the activated sludge system by recycling may vary.

The term "waste activated sludge" may also refer to the continuous flow reactor oxidized sludge stream output of the reactor oxidation process which contains a mixture of reactivated carbon (with some biomass), ash and water and wherein it is desirable to remove ash from the mixture prior to introduction back into the treatment process. It is within the scope of this invention to utilize the method and apparatus to remove ash from such waste actuated sludge mixtures of water, ash and powdered carbon. It should also be understood that the carbon referred to herein may be either powder or granular carbon.

It is important that the powdered activated carbon be recovered as the material must be replaced within the sewage treatment system if not recovered. It is also important that the system be relieved of a maximum amount of inert or insoluble material such as the ash. If the ash is not taken out of the system, the total inert material gradually builds up in the treatment system. Excessive ash build up results in large quantities of higher dense material building up in the aeration tanks, final clarifiers and can cause considerable wear on the piping, pumps and related mechanical equipment. In addition, additional care needs to be exercised in maintaining all of the suspended solids in circulation; otherwise considerable solids can settle out in the aeration tank causing difficulty by entrapping biological solids which in the activated sludge process must be in the aerobic state and with them entrapped and covered over such solids could be created anaerobic areas with detrimental results to the treatment system causing excessive demand for oxygen which may not be readily available. Consequently the entire activated sludge treatment could be deteriorated.

Referring to the drawings, the letter S generally designates the separating apparatus of the preferred embodiment of this invention. The separation apparatus S basically includes a pressure regulating means 10 for receiving the incoming waste activated sludge (arrow 11) for controlling the pressure of the incoming waste activated sludge for delivery to a first stage separation means generally designated as 12. The first stage separation means 12 is mounted in fluid communication with the pressure regulating means 10 for receiving the incoming waste activated sludge and separating the incoming waste activated sludge into an effluent output containing substantially supernatant and powdered carbon and into a hydrocyclone underflow output containing supernatant and a substantially greater solid concentration of ash than in the effluent. A first return means 14 is provided for collecting the effluent output which contains a lower solids concentration than the underflow output of the first stage separation means 12.

A second stage separation means 15 is mounted in fluid communication with the first stage separation means 12 for receiving the underflow output of the first stage separation means 12 and for separating such underflow output into a second stage screen underflow and a resultant second stage ash concentrate for disposal into some type of receptacle R. The receptacle R may be any type of vessel, bin, trailer or the like which receives the resultant solids concentrate for disposal. The receptacle R may also be a vessel wherein the second stage solids concentrate is further concentrated prior to disposal by decanting or the like. A second return means generally designated as 16 is mounted in fluid communication with the second stage separation means 15 in order to receive the second stage screen underflow and direct such second stage screen underflow into fluid communication with the first return means 14.

The separation apparatus S includes opposing front to rear directed bottom skid members 20a and 20b which are interconnected by a front transverse bottom frame member 20c and a rear transverse bottom frame member 20d to provide the generally rectangular bottom support frame 20.

Figure 2:
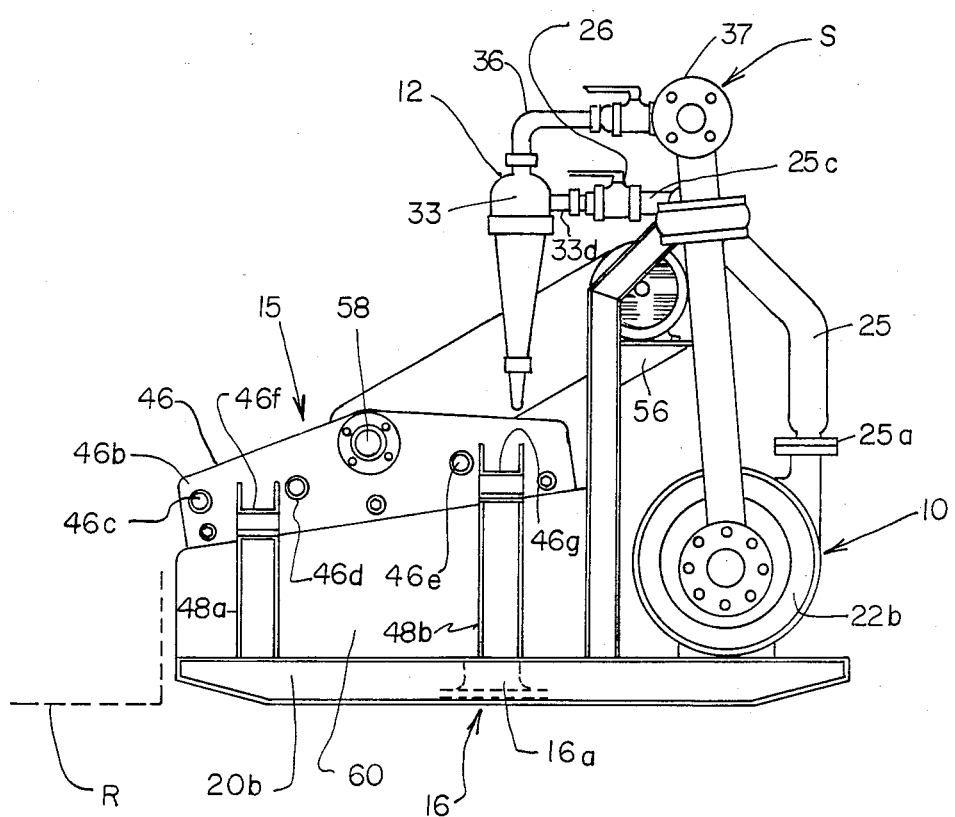
FIG. 2 is a side view of such apparatus.
Figure 3:
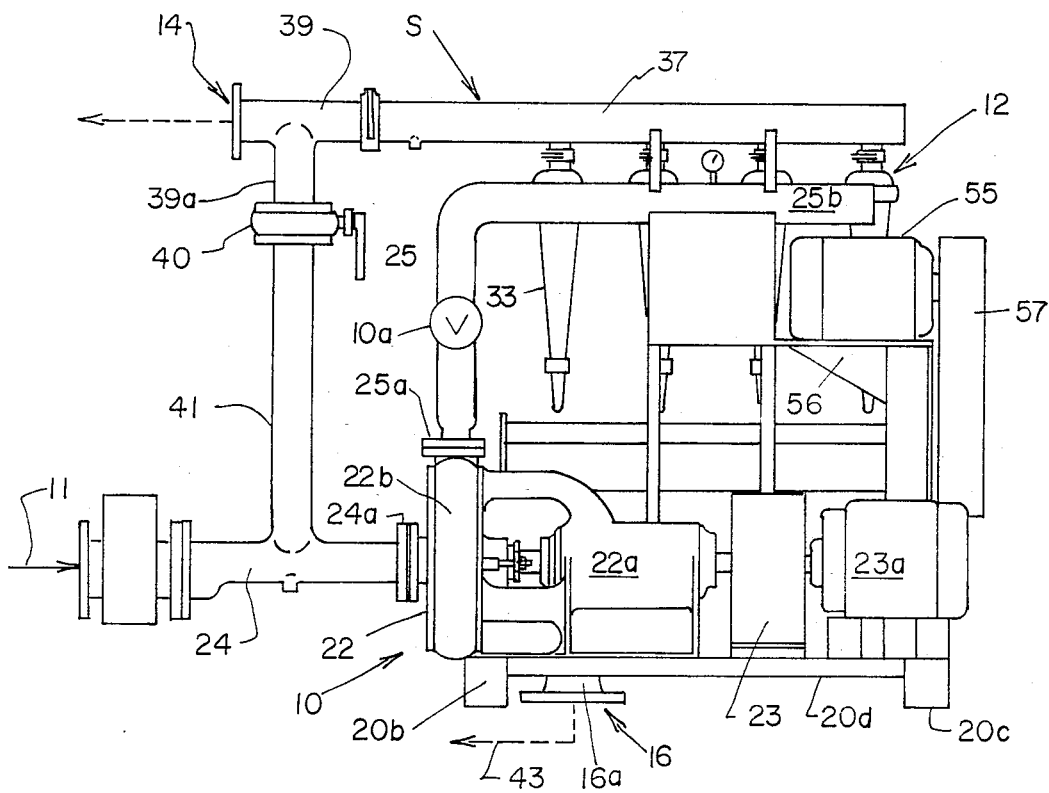
FIG. 3 is a rear view of such apparatus.

The pressure regulating means 10 is mounted at the rear of the separation apparatus S and thus is shown most completely in FIG. 3. Referring to FIG. 3, the pressure regulating means 10 includes a centrifugal pump 22 which is driven through coupling 23 by electric motor 23a. The electric motor 24 is mounted onto the rear corner intersection of bottom frame members 20c and 20d and has its output shaft connected through coupling 23 to housing 22a which operably connects to the impeller 22b in a well-known manner. The waste activated sludge incoming from direction 11 is received in incoming line 24 after passing through strainer 24a mounted with incoming pipe 24. The line or pipe member 24 is connected by flange connection 24a to the input of impeller 22b. The output of impeller 22b is connected by flange connection 25a to an output pipe member 25. The output pipe member 25 is L-shaped as illustrated in FIGS. 1 and 3 and includes a horizontal portion 25b having four outlet nipples such as 25c illustrated in FIG. 2. Each of the outlet nipples 25c has attached thereto a valve 26. It is without the scope of this invention to utilize other devices to regulate pressure including, for example, flow control valve 10a.

The first stage separation means 12 includes a plurality of parallel mounted centrifugal separation means or hydrocyclones 30-33 attached to the pipe member output nipples such as 25c for receiving the incoming waste activated sludge at increased pressure as a result of circulation of the waste activated sludge through the rotating pump impeller 22b. Each of the hydrocyclones are made of a polyurethane and, referring to hydrocyclone 33, include a cylindrical separation chamber 33a and a truncated conical portion 33b terminating in a bottom apex 33c. The size of the hydrocyclones used in a preferred embodiment is two inches. Each hydrocyclone such as 33 includes a tangential inlet 33d (FIG. 2) which is coupled to valve element 26 for receiving the incoming waste activated sludge. Each hydrocyclone such as 33 includes an effluent fluid output 33e located at the top of the separation chamber 33a. The underflow having a higher solids concentration exits through the bottom apex 33c. Each of the effluent fluid outputs 33e are coupled by a quick disconnect member 35 to L-shaped first stage output members 36, which connect to the horizontally extending pipe member 37 of the first stage return means 14. The first stage return member 37 is connected by a quick disconnect 38 to a tee joint 39 having a bypass section 39a which is joined to a valve 40 and bypass pipe member 41 which extends into connection with the inlet pipe member 24. In this manner, the entire separation apparatus S can be bypassed if necessary by the shutting off of the pump motor 24 and opening of valve 40. Normally, when the separation apparatus S is in use, the valve 40 is closed so that the incoming waste activated sludge circulates through the separation apparatus S with the effluent fluid output of the hydrocyclones 30-33 entering the return pipe member 37 and horizontal portion of the tee 39 to return to the waste water treatment process as represented by arrow 42. The exact location and function of the second return output means 16, which includes output flange 16a, will be described hereinafter; however, it should be understood that the dashed line 42 from the tee 39 connected to first stage return pipe member 37 and the dashed line 43 from second stage output 16a can be combined into one return fluid stream for return to the sewage treatment process for reuse. The effluent or primary output substantially contains a supernatant and carbon, but may still contain a small amount of ash as it is impossible to remove all the ash. The term "supernatant" as used herein is intended to define the water stream which may have various impurities of a result of recycling through the process.

The second stage separation means generally designated as 15 is mounted onto the bottom frame members 20a-20d directly below the underflow fluid outlets 33c at the bottom apex of the conical sections 33b of each of the hydrocyclones 30-33 for receiving such underflow fluid output from the hydrocyclones and further processing such fluid into a second stage screen underflow fluid output and an ash output concentrate for ultimate disposal. The second stage separation means 15 includes an open screen member 45 which is a fine mesh screen having side lips (not shown) which provide for mounting of the screen into a basket frame 46.

The basket frame 46 includes basket side plates 46a and 46b which extend front to rear of the apparatus and are joined together by transverse tubular frame elements 46c, 46d and 46e (FIG. 2) which extend between and are joined to the side plate members 46a and 46b. The side plate members 46a and 46b include internally extending fixed tension rail members or channels 47a and 47b which are mounted internally of the side plate members 46a and 46b, respectively, to provide a mounting mechanism as is well-known in the art of oilwell drilling mud solids separation of the open mesh screen member 45. The open mesh screen 45 is fixedly attached to the channel member 47a and adjustably attached with the channel member 47b so that the tension of the screen is adjustable in a manner known in the art of utilization of vibratory screens in oilwell drilling mud solids separation.

The side plate 46b includes space outwardly extending basket support lugs 46f and 46g which are welded onto the exterior of the side plate and extend outwardly. The side plate 46b also has two spaced outwardly extending basket support lugs, only lug 46c being shown (FIG. 1). Two spaced upwardly extending vertical channel supports 48a and 48b are welded onto the channel 20b and extend upwardly therefrom. The height of the vertical support 48b is greater than the support 48a. Each of the supports terminate in a platform having mounted thereon a rubber vibrating isolator 49. The rubber vibrator isolators 49 are positioned between the top of each of the vertical supports 48a and 48b and the basket support lugs 46f and 46g extending from the side plate 46b in order to mount the basket side plate 46b and thus the entire basket frame 46 for vibration. Turning to the other side of the basket frame 46, two vertical supports, only one of which, 50a, is shown, are mounted on the channel 20a and extend upwardly in alignment with the frame members 48a and 48b. The vertical supports such as 50a also have mounted thereon the vibratory isolators 49 to support outwardly extending basket support lugs such as 46c mounted on the side plate 46a in order to mount the entire basket frame 46 for vibration. A motor 55 is mounted on frame platform 56 and includes a belt drive (mounted within guard 57) for driving shaft 58. Shaft 58 is mounted with each of the side plates 46a and 46b and extends therebetween, the mounting being by means of suitable bearings. The shaft 58 is round at each end where the shaft is mounted to the side plates 46a and 46b but is eccentric in a center section of the shaft between the side plates for imparting a vibratory motion to the basket frame 46. The shaft 58 is mounted within a protective shaft tube 59 which also extends between the side plates 46a and 46b.

Figure 4:
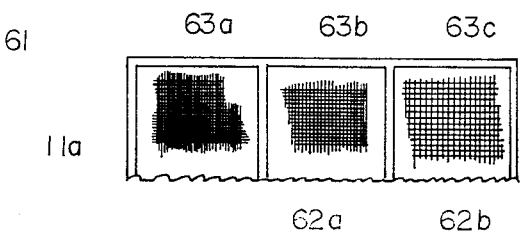
FIG. 4 is a top view of a portion of a vibrating screen design for this invention.

The mesh size of screen 45 is sufficient to allow the passage only of supernatant and powdered carbon and to block the passage of the larger particulate which constitutes a substantial portion of the ash and possibly some other solids such that the ash solids are vibrated off of the top of the screen into the receptable R during operation. Referring to FIG. 4, an alternate design for the screen is illustrated. The screen 61 of FIG. 4 includes a frame which is generally rectangular (only a representative segment being shown in FIG. 4) and includes transverse frame members 62a and 62b. The frame members 61a, 62a and 62b divide the screen into three sections 63a, 63b, and 63c each having screen mesh openings of a different size. Section 63a has the smallest opening size and is designed to be located below the bottom apex 33c of the hydrocyclones 30–33 to first receive the underflow output. The section 63a is sufficiently small to pass only carbon and supernatant. The opening size in the screen 63b is slightly larger than 63a and the screen size 63c is even larger such that more supernatant can be recovered during vibration with screen section 63c being positioned adjacent to receptacle R so that the partially caked ash concentrate flows or vibrates into receptacle R from section 63c.

A four-sided receiving tank 60 having a bottom is positioned on bottom frame members 20a, 20b and 20c to receive fluid coming through the openings into vibrating screen 45. Outlet 16a is welded into the bottom of tank 60 to provide second output means 16.

The separation Apparatus A of this invention is utilized to practice the process for the substantial removal of ash from a waste activated sludge stream containing substantially water (supernatant) and ash from the autothermal reaction in a wet oxidation sewage treatment process. The first step in the practice of such process is the receiving of the waste activated sludge as represented by the arrow 11 and controlling the pressure of the incoming waste activated sludge in centrifugal pump impeller 22b and circulating the controlled pressure incoming waste activated sludge through pipe member 25a to a first stage separation means 12. It should be understood that the pressure regulation means 10 may include other pressure control devices such as the flow control valve 10a. In the first separation stage the controlled pressure waste activated sludge at a higher pressure from pump impeller 22b is circulated through a plurality of hydrocyclones 30–33 in parallel flow paths to produce an effluent first fluid output containing supernatant and powdered carbon and a substantially lesser concentration of ash solids as compared to the concentration of such ash solids in the incoming waste activated sludge. Circulation of the incoming waste activated sludge through the plurality of hydrocyclones 30–33 also produces an underflow second output containing supernatant and a greater solids concentration of ash than the effluent fluid. The effluent output containing substantially supernatant and carbon is circulated through a first return pipe member 37 for recirculation.

The underflow second output from the first separation stage hydrocyclones 30–33 flows out of the bottom apex 33c of each hydrocyclone and into the second stage separation means 15 to further separate ash from the first stage underflow output to produce a second stage underflow primary output containing substantially supernatant and carbon and a resultant second stage ash concentrate for disposal. In operation, the second stage separation means 15 includes a vibratory basket frame 46 which vibrates a generally rectangular screen 45 having a mesh size opening sufficient to only allow the passage of supernatant and carbon (with some ash) therethrough into the bottom receptacle 60. As previously mentioned, the discharge flange opening 16a is connected, as represented by schematic dashed line 43, to a pipeline common to the fluid return line 37 and tee member 39 so that the primary output fluid mixtures, that is, effluent from the hydrocyclones and underflow through screen 45, are joined together for return or recirculation to the waste water treatment plant. The underflow fluid output from the first stage separation means 12 is further concentrated as a result of the separation through the screen of water and powdered carbon thus leaving an ash concentrate containing substantially higher concentrations of ash which mass is vibrated or flows off of the screen 45 into the receptacle R for disposal or further refinement and disposal. The mass vibrated off the screen has had sufficient water removed that at least some of the output is in a cake-like form.

The apparatus S and the process of this invention as practiced in the apparatus S has been described with respect to the refinement and separation operations practiced upon the sludge blown down out of the reactor in a wet oxidation waste water treatment process and the continuous output of the reactor. The purpose of the process of this invention is to recover as much carbon and water or supernatant as possible and to reduce the resultant ash concentrate containing principally ash as much as possible for the purposes of efficient disposal.

It is also within the scope of this invention to utilize the method of the invention in a fluid stream from the sewage treatment plant taken from a secondary clarifier system, which is referred to as return activated sludge, for the purpose of principally removing the ash from the return activated sludge containing water, ash, powdered carbon and organic biomass which is joined with the powdered carbon.

The foregoing disclosure and description of the invention are illustrative and explanatory thereof, and various changes in the size, shape and materials, as well as in the details of the illustrated construction may be made without departing from the spirit of the invention.

We claim:

1. Process for the substantial removal of ash from a waste activated sludge stream containing supernatant, ash and carbon as suspended solids comprising the steps of:
   receiving an incoming waste activated sludge stream primarily containing supernatant, ash and carbon;
   controlling the pressure of said waste activated sludge stream and circulating said waste activated sludge at said controlled pressure to a first separation stage;
   in said first separation stage, circulating said controlled pressure waste activated sludge through a plurality of hydrocyclones in parallel flow paths to produce a first fluid output substantially containing supernatant and carbon and a second fluid output containing supernatant, carbon and a substantially greater concentration of ash than said first fluid output;
   collecting said first fluid from said hydrocyclones into a first return output for recirculation back into said sewage treatment process;
   circulating said second fluid output from said first separation stage through a second separation stage to further separate ash from said first stage second fluid output to produce a second stage third fluid output containing substantially supernatant and powdered carbon and a fourth output which is an ash concentrate for ultimate disposal.

2. The process set forth in claim 1, including the step of:
   circulating said first separation stage first fluid output and said second stage third fluid output into a common stream for return to a waste water treating process.

3. The process set forth in claim 1 where the step of circulating said first stage second fluid output through a second separation stage includes the step of:
   directing said second fluid output, which is underflow from said hydrocyclones, from said first separation stage onto a vibratory screen to allow only a third fluid output substantially containing supernatant and powdered carbon through said screen, and vibrating a fourth output of a heavier concentrate of ash off of said screen for disposal.

4. The process set forth in claim 3, including:
   utilizing a vibratory screen having openings of a size to pass substantially only carbon and supernatant which form said third fluid output.

5. The process set forth in claim 1, wherein:
   the pressure of the incoming waste activated sludge stream is increased prior to introduction into said first separation stage.

6. The process set forth in claim 1, wherein:
   said waste activated sludge stream is blown down from an autothermal reactor.

7. The process set forth in claim 1, wherein:
   said waste activated sludge stream is the continuous flow stream having a wet air oxidation reactor containing supernatant, reactivated carbon and ash.

8. The process set forth in claim 1, wherein:
   said waste activated sludge stream is return activated sludge from a secondary clarifier system.

9. The process set forth in claim 1, wherein:
   said first fluid output is a supernatant.

10. The process set forth in claim 1, wherein:
    said fourth output from said second stage separation is partially in a cake-like form.

* * * * *